US 012689817B2

(12) United States Patent
Oh et al.

(10) Patent No.: US 12,689,817 B2
(45) Date of Patent: Jul. 21, 2026

(54) DISPLAY DEVICE HAVING AN INTEGRATED CAMERA APERTURE SYSTEM

(71) Applicant: Dell Products L.P., Round Rock, TX (US)

(72) Inventors: Guentaek Oh, Singapore (SG); KyungEun Lee, Singapore (SG)

(73) Assignee: Dell Products L.P., Round Rock, TX (US)

( * ) Notice: Subject to any disclaimer, the term of this patent is extended or adjusted under 35 U.S.C. 154(b) by 158 days.

(21) Appl. No.: 18/433,001

(22) Filed: Feb. 5, 2024

(65) Prior Publication Data

US 2025/0254412 A1 Aug. 7, 2025

(51) Int. Cl.
| | |
|---|---|
| *H04N 23/57* | (2023.01) |
| *G02F 1/1333* | (2006.01) |
| *G03B 9/02* | (2021.01) |
| *G03B 30/00* | (2021.01) |
| *H04N 23/75* | (2023.01) |
| *G02F 1/167* | (2019.01) |
| *G02F 1/1685* | (2019.01) |

(52) U.S. Cl.
CPC ....... *H04N 23/57* (2023.01); *G02F 1/133308* (2013.01); *G02F 1/13338* (2013.01); *G03B 9/02* (2013.01); *G03B 30/00* (2021.01); *H04N 23/75* (2023.01); *G02F 1/167* (2013.01); *G02F 1/1685* (2019.01)

(58) Field of Classification Search
CPC .. H04N 23/57; H04N 23/75; G02F 1/133308; G02F 1/13338; G02F 1/167; G02F 1/1685; G03B 9/02; G03B 30/00
See application file for complete search history.

(56) References Cited

U.S. PATENT DOCUMENTS

| | | | | |
|---|---|---|---|---|
| 2010/0253832 A1* | 10/2010 | Duparre | ............... | H10F 39/804 |
| | | | | 348/360 |
| 2011/0058266 A1* | 3/2011 | Chang | .................... | G02B 5/005 |
| | | | | 359/819 |
| 2014/0002365 A1* | 1/2014 | Ackley | ................. | G06F 3/0219 |
| | | | | 345/173 |
| 2019/0033686 A1* | 1/2019 | Kinoshita | ............ | G03B 11/043 |
| 2021/0233974 A1* | 7/2021 | Qiu | ........................ | H04N 23/57 |
| 2022/0321755 A1* | 10/2022 | Nicholson | .............. | H04N 23/73 |

* cited by examiner

*Primary Examiner* — Mekonnen D Dagnew
(74) *Attorney, Agent, or Firm* — Terrile, Cannatti & Chambers, LLP; Stephen A. Terrile

(57) ABSTRACT

A display device which includes a display component; a display frame; an embedded camera system, the embedded camera system including a camera component, the camera component being physically coupled to the display frame to embed the camera component within the display device and an electronic aperture component, the electronic aperture component being physically coupled to the display frame of the display device, the electronic aperture component providing a variable diameter opening, the variable diameter opening controlling an amount of light received by the camera component.

9 Claims, 13 Drawing Sheets

600

634

640

605

610

644

632  630

700

6

714   710

712   720

716

6

730

DISPLAY DEVICE HAVING AN INTEGRATED CAMERA APERTURE SYSTEM

BACKGROUND OF THE INVENTION

Field of the Invention

The present invention relates to information handling systems. More specifically, embodiments of the invention relate to information handling system display devices.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

An information handling system display device which includes an integrated camera system is disclosed.

More specifically, in one embodiment the invention relates to an embedded camera system for a display device comprising: a camera component, the camera component being physically coupled to the display frame to embed the camera component within the display device and an electronic aperture component, the electronic aperture component being physically coupled to the display frame of the display device, the electronic aperture component providing a variable diameter opening, the variable diameter opening controlling an amount of light received by the camera component.

In another embodiment the invention relates to a display device comprising: a display component; a display frame; an embedded camera system, the embedded camera system comprising a camera component, the camera component being physically coupled to the display frame to embed the camera component within the display device and an electronic aperture component, the electronic aperture component being physically coupled to the display frame of the display device, the electronic aperture component providing a variable diameter opening, the variable diameter opening controlling an amount of light received by the camera component.

In another embodiment the invention relates to a system comprising: a processor; a data bus coupled to the processor; and a display device, the display device comprising an embedded camera system, the embedded camera system comprising a camera component, the camera component being physically coupled to the display frame to embed the camera component within the display device and an electronic aperture component, the electronic aperture component being physically coupled to the display frame of the display device, the electronic aperture component providing a variable diameter opening, the variable diameter opening controlling an amount of light received by the camera component.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
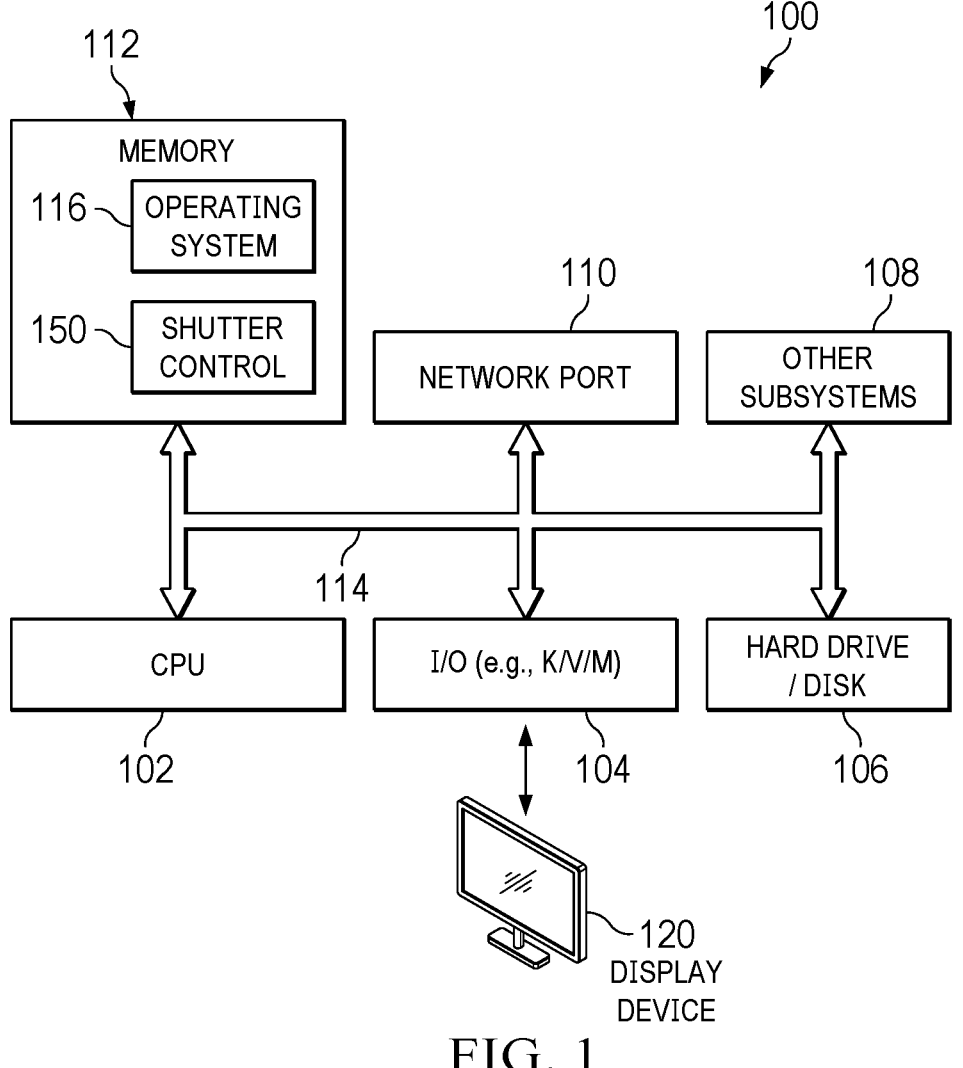
FIG. 1 shows a general illustration of components of an information handling system as implemented in the present disclosure.

Certain aspects of the invention reflect an appreciation that it would be desirable to provide display devices which include embedded camera systems with a privacy function. Certain aspects of the invention reflect an appreciation that certain known embedded camera systems provide a camera active indicia, such as a light indication, when the camera system is active.

Certain aspects of the invention reflect an appreciation that certain known embedded camera systems include mechanical shutter systems. Certain aspects of the invention reflect an appreciation that it is challenging to provide mechanical shutter systems to certain known display devices, such as narrow bezel display devices. With certain narrow bezel display devices there is not enough space on the bezel to allow for a shutter such as an accessory shutter solution.

Accordingly, a system and method are disclosed for providing an information handling system display device with an embedded camera system having an electronic shutter system. In various embodiments, the embedded camera system includes a camera component, an electronic shutter component, a display frame portion, a display device frame portion, or a combination thereof. In certain embodiments, the camera component is embedded along an edge of the display device frame portion. In certain embodiments, the camera component is embedded along a top edge of the display device frame portion. In certain embodiments, the camera component is embedded in a center area of the display device frame portion.

In certain embodiments, the electronic shutter component is mounted along an edge of the display device frame portion. In certain embodiments, the electronic shutter component is mounted along a top edge of the display device frame portion. In certain embodiments, the electronic shutter component is mounted in a center area of the display device frame portion. In certain embodiments, the electronic shutter component is mounted in front of the camera component.

In certain embodiments, the electronic shutter component includes a an electronically controllable obfuscation device. In certain embodiments, when in a camera off mode of operation, the electronic shutter component restricts visual access to a camera component. When in the camera on mode of operation, the electronic shutter component provides visual access to the camera component.

Additionally, certain aspects of the invention reflect an appreciation that various cameras can be designed to include an aperture function. Certain aspects of the invention reflect an appreciation that an aperture function controls a diameter of an opening in front of a camera lens. Certain aspects of the invention reflect an appreciation that the diameter of the opening controls how much light reaches the camera lens. Certain aspects of the invention reflect an appreciation that an aperture function is an important aspect of a camera exposure triangle which includes the aperture, an international organization for standardization (ISO) sensor light sensitivity value and a shutter speed value. Certain aspects of the invention reflect an appreciation that an aperture function affects a depth of field of the camera. Certain aspects of the invention reflect an appreciation that the depth of field describes a level of clarity or blurriness of elements sensed by the camera. Accordingly, various aspects of the invention include an appreciation that it would be desirable to provide embedded camera systems with an aperture function. However, various aspects of the invention include an appreciation that it is challenging to implement a mechanical aperture structure within an embedded camera system, especially embedded camera systems which are included within narrow bezel display devices.

Accordingly, a system and method are disclosed for providing an information handling system display device with an embedded camera system having an electronic aperture system. In various embodiments, the embedded camera system includes a camera component, an electronic aperture component, a display frame portion, a display device frame portion, or a combination thereof. In certain embodiments, the camera component is embedded along an edge of the display device frame portion. In certain embodiments, the camera component is embedded along a top edge of the display device frame portion. In certain embodiments, the camera component is embedded in a center area of the display device frame portion.

In certain embodiments, the electronic aperture component includes an electronically controllable aperture device. In certain embodiments, the electronic aperture component may be controlled to vary a diameter of an opening. In certain embodiments, the opening is located in front of a camera lens and controls an amount of light that is received by the camera lens.

In certain embodiments, the display device frame portion corresponds to a middle frame of the display device. In certain embodiments, the display device frame portion defines a void along a surface of a top panel of the display device frame. In certain embodiments, the camera component, the shutter component, or a combination thereof, are mounted within the void defined along a surface of the top panel of the display device frame.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116. In various embodiments, the information handling system 100 is coupled with and communicates with a display device 120. In certain embodiments, system memory 112 includes a shutter control system 150, a camera control system 152, or a combination thereof. In various embodiments, the information handling system is integrated with the display device to provide an all in one (AIO) type information handling system. In certain embodiments, the information handling system includes a portable information handling system which includes an integrated display device.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

In certain embodiments, the display device 120 includes an embedded camera system. In various embodiments, the embedded camera system includes a camera component, an electronic shutter component, an electronic aperture component, a display device frame portion, or a combination thereof. In certain embodiments, the camera component is embedded along an edge of the display device frame portion. In certain embodiments, the camera component is embedded along a top edge of the display device frame portion. In certain embodiments, the camera component is embedded in a center area of the display device frame portion. In certain embodiments, the electronic aperture component provides an electrically controllable variable diameter opening through which light is propagated to the camera component.

In certain embodiments, the electronic aperture component includes an electronically controllable aperture device. In certain embodiments, the electronic aperture component may be controlled to vary a diameter of an opening through which light is propagated to the camera component. In certain embodiments, the opening is located in front of a camera lens and controls an amount of light that is received by the camera lens.

Figure 2:
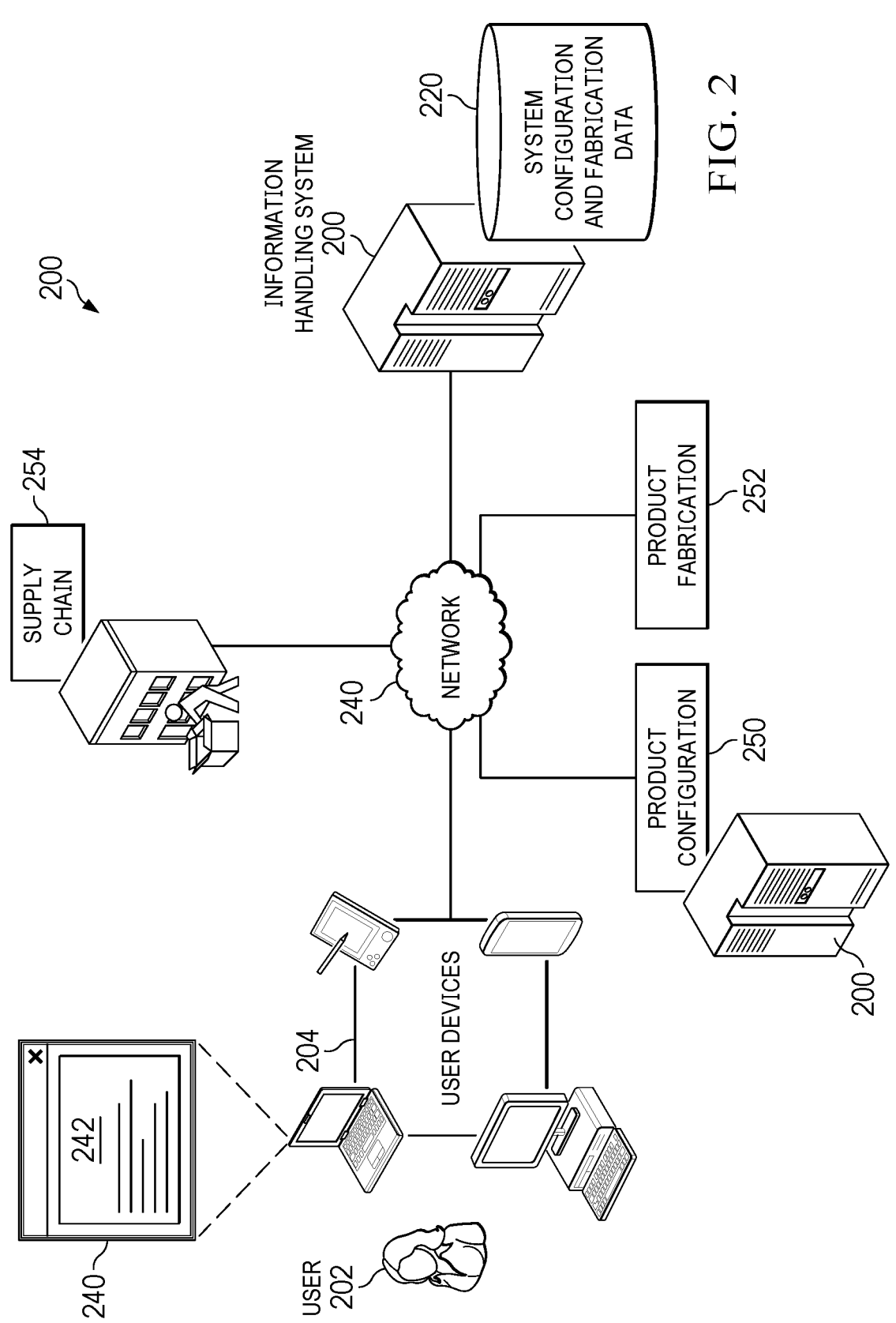
FIG. 2 shows a block diagram of an information handling system configuration and fabrication environment.

FIG. 2 is a block diagram of an information handling system configuration and fabrication environment 200 implemented in accordance with an embodiment of the invention. In certain embodiments, the information handling system configuration and fabrication environment 200 may include a repository of information handling system configuration and fabrication data 220. In certain embodiments, the repository of information handling system configuration and fabrication data 220 may be local or may be executed remotely.

In certain embodiments, the user device 204 is used to exchange information between the user 202 and a product configuration system 250, and a custom product fabrication system 250, through the use of a network 240. In certain embodiments, the network 240 may be a public network, such as a public internet protocol (IP) network, a physical private network, a wireless network, a virtual private network (VPN), or any combination thereof. Skilled practitioners of the art will recognize that many such embodiments are possible and the foregoing is not intended to limit the spirit, scope or intent of the invention. As used herein, a user device 204 refers to an information handling system such as a personal computer, a laptop computer, a tablet computer, a personal digital assistant (PDA), a smart phone, a mobile telephone, or other device that is capable of communicating and processing data. In certain embodiments, the user device 204 may be configured to present a configuration and/or fabrication system user interface (UI) 240. In certain embodiments, the configuration and/or fabrication system UI 240 may be implemented to present a graphical representation 242 of configuration and/or fabrication information.

In various embodiments, the configuration and/or fabrication system UI 240 may be presented via a website. In certain embodiments, the website may be provided by the product configuration system 250. For the purposes of this disclosure a website may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input to a web server.

In certain embodiments, the user device 204 may be implemented to interact with the product configuration system 250, which in turn may be executing on a separate information handling system 200. In various embodiments, the product configuration system 250 interacts with a custom product fabrication system 252. In various embodiments, the custom product fabrication system 252 fabricates products.

In various embodiments, the fabricated product includes a display device. In various embodiments, the display device includes an embedded camera system. In various embodiments, the embedded camera system includes a camera component, an electronic shutter component, a display device frame portion, or a combination thereof.

In certain embodiments, the camera component is embedded along an edge of the display device frame portion. In certain embodiments, the camera component is embedded along a top edge of the display device frame portion. In certain embodiments, the camera component is embedded in a center area of the display device frame portion.

Figure 3A:
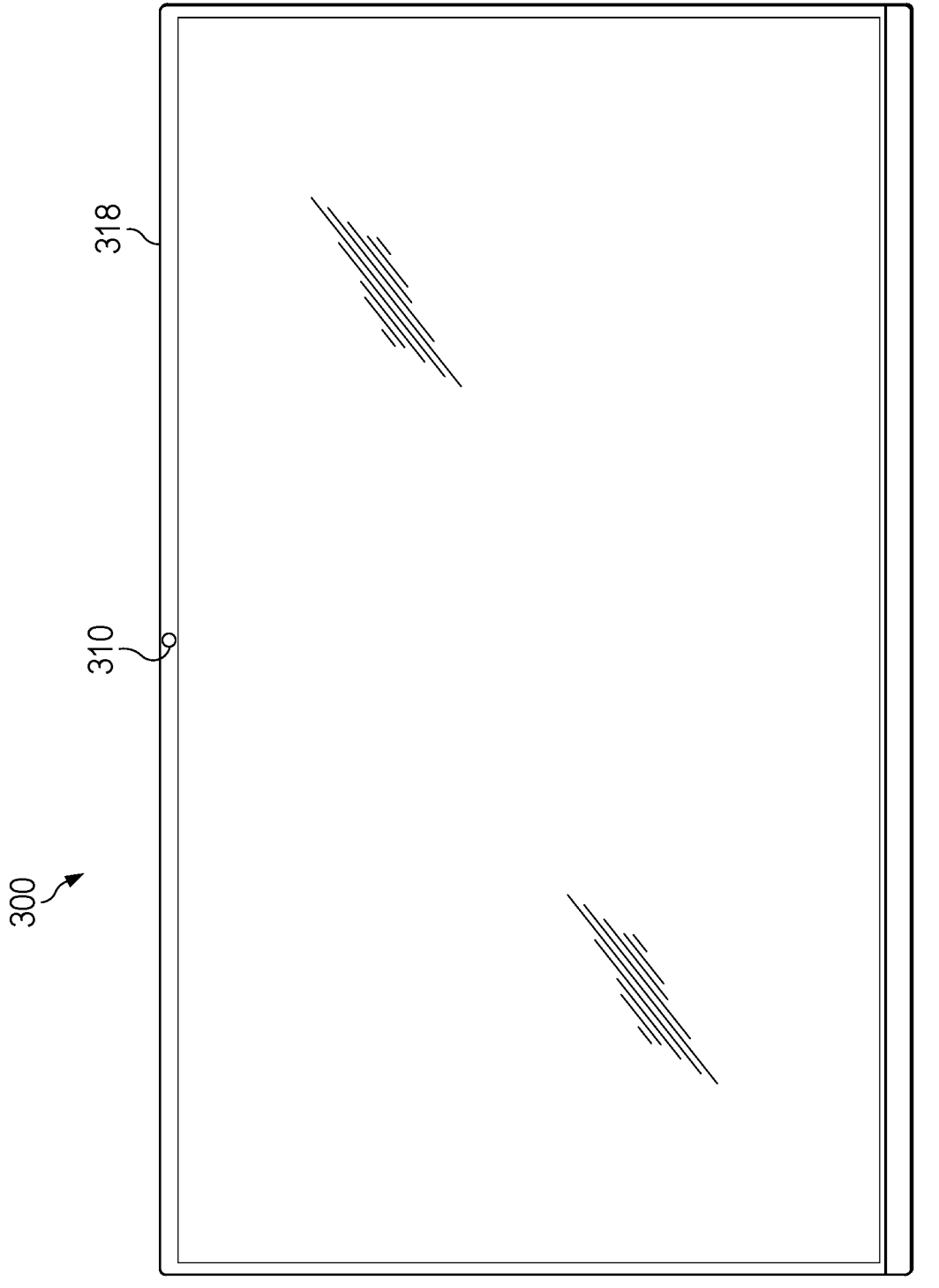
FIGS. 3A and 3B, generally referred to as FIG. 3, respectively show a front view and an exploded perspective view of a display device having an embedded camera system.
Figure 3B:
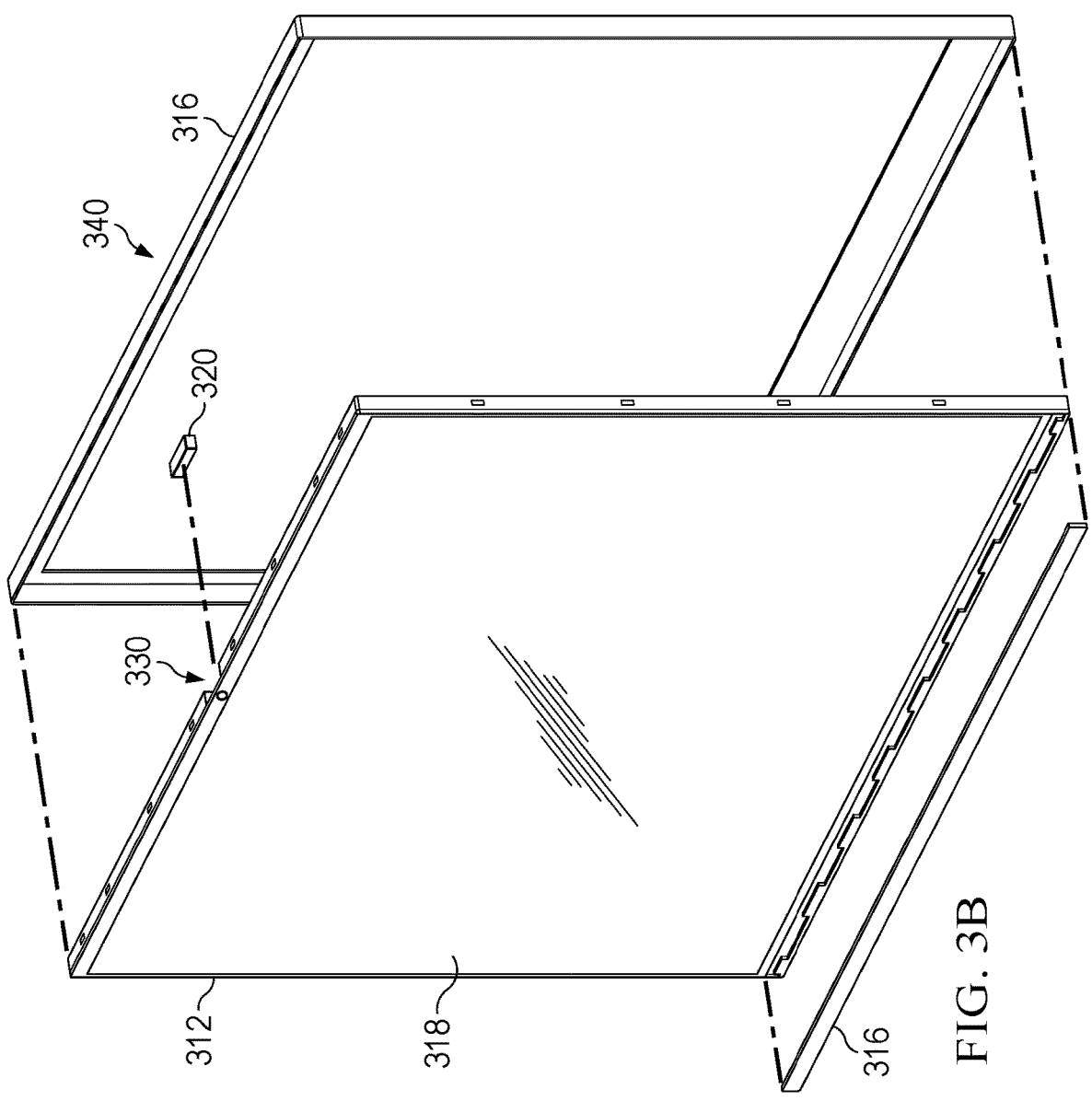

FIGS. 3A and 3B, generally referred to as FIG. 3, respectively show a front view and an exploded perspective view of a display device 300 having an embedded camera system 310. In certain embodiments, the display device 300 includes a display frame component 312, a frame component 314, a front deco component 316, or a combination thereof. In certain embodiments, a display 318 is mounted to the display frame component 312. In certain embodiments, the display device frame component 314 is integrated within a middle frame component of the display device 300. In certain embodiments, the front deco component 350 is mounted along an edge of the display frame component.

In certain embodiments, the embedded camera system 310 includes a camera component 320 having an associated electronic shutter component, a display device frame portion 330, a display device frame portion 340, or a combination thereof. In certain embodiments, the display device frame portion 330 is integrated within the display frame component 312 of the display device 300. In certain embodiments, the display device frame portion 340 is integrated within the display device frame component 314 of the display device 300.

In certain embodiments, the camera component 320 is embedded along an edge of the display device frame portion 340. In certain embodiments, the camera component 320 fits within a notch defined by the display device frame portion 330. In certain embodiments, the camera component 320 is embedded along a top edge of the display device frame portion 340. In certain embodiments, the camera component 320 is embedded in a center area of the display device frame portion 340.

In certain embodiments, the shutter component 322 is mounted along an edge of the display frame portion 330. In certain embodiments, the associated electronic shutter component is mounted along a top edge of the display frame portion 330. In certain embodiments, the camera component 320, the associated electronic shutter component or a combination thereof, are mounted in a center area of the display device frame portion.

Figure 4:
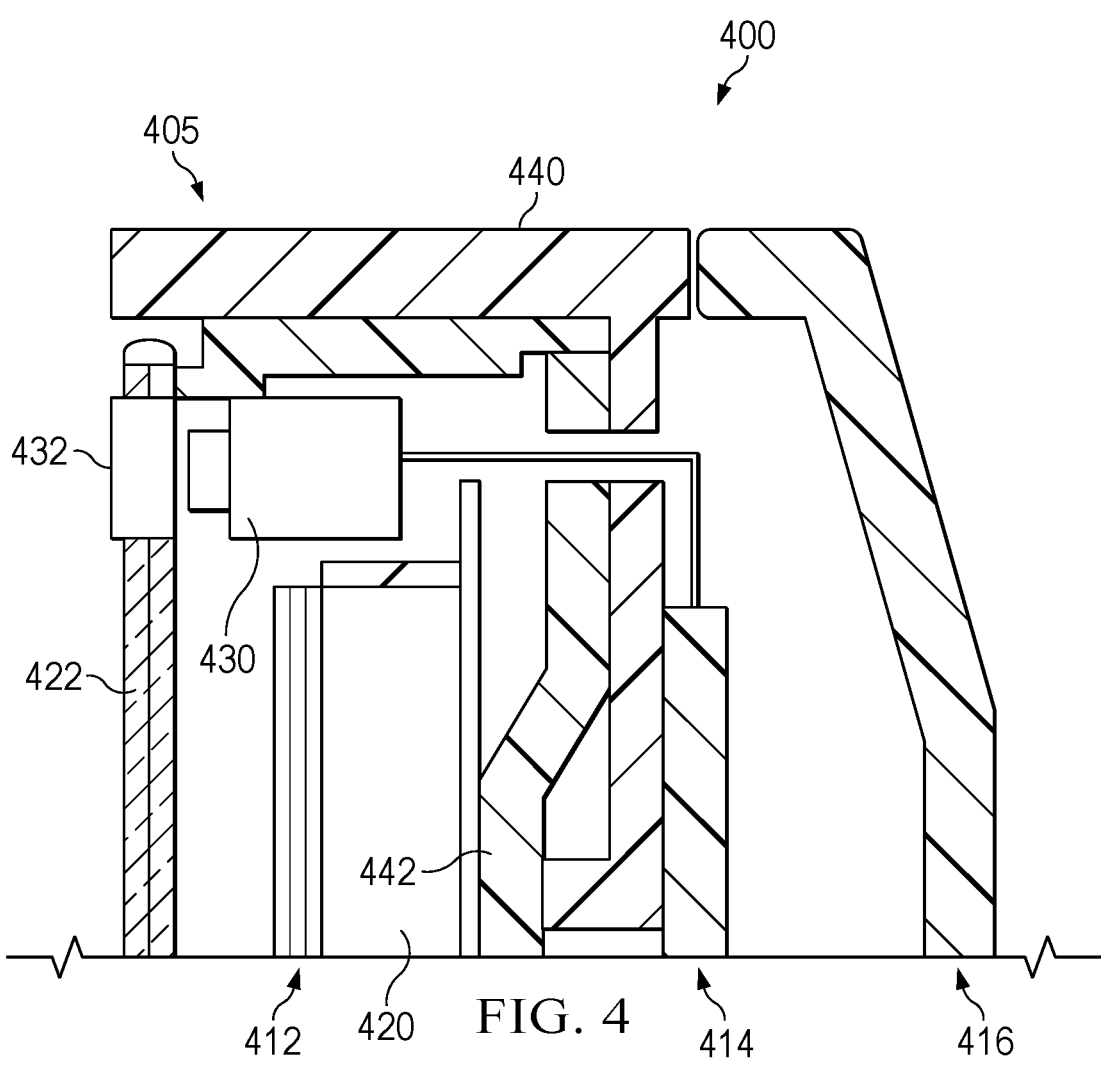
FIG. 4 shows a cut away side view of a portion of a display device having an embedded camera system.

FIG. 4 shows a cut away side view of a portion of a display device 400 having an embedded camera system 405. In certain embodiments, display device 400 corresponds to display device 300. In certain embodiments, the embedded camera system 405 corresponds to embedded camera system 310.

In certain embodiments, the display device 400 includes a display portion 412, a support frame portion 414, a rear frame portion 416, or a combination thereof. In certain embodiments, the display frame portion 412 includes a display component 420, a front display panel 422, or a combination thereof. In certain embodiments, one or both the display component 420 and the front display panel 422 are mounted to the display frame portion 412. In certain embodiments, the display device frame portion 414 is integrated within a middle frame component of the display device 400. In certain embodiments, the rear frame portion 416 is mounted along an outside edge of the support frame portion 414.

In certain embodiments, the embedded camera system 405 includes a camera component 430, an associated electronic shutter component 432, a display frame portion 440, a display device frame portion 442, or a combination thereof. In certain embodiments, the display frame portion 440 is integrated within the display frame portion 412 of the display device 400. In certain embodiments, the display device frame portion 442 is integrated within the display device frame portion 414 of the display device 400.

In certain embodiments, the camera component 430 is embedded along an edge of the display device frame portion 440. In certain embodiments, the camera component 430 fits within a void defined by the display frame portion 440. In certain embodiments, the camera component 430 is embedded along a top edge of the display device frame portion 442. In certain embodiments, the camera component 430 is embedded in a center area of the display device frame portion 442.

In certain embodiments, the electronic shutter component 432 is mounted in front of a lens of the camera component 430. In certain embodiments, the electronic shutter component is along a top edge of the front panel display 422. In certain embodiments, the camera component 430, the electronic shutter component 432 or a combination thereof, are mounted in a center area of the display device frame portion.

Figure 5B:
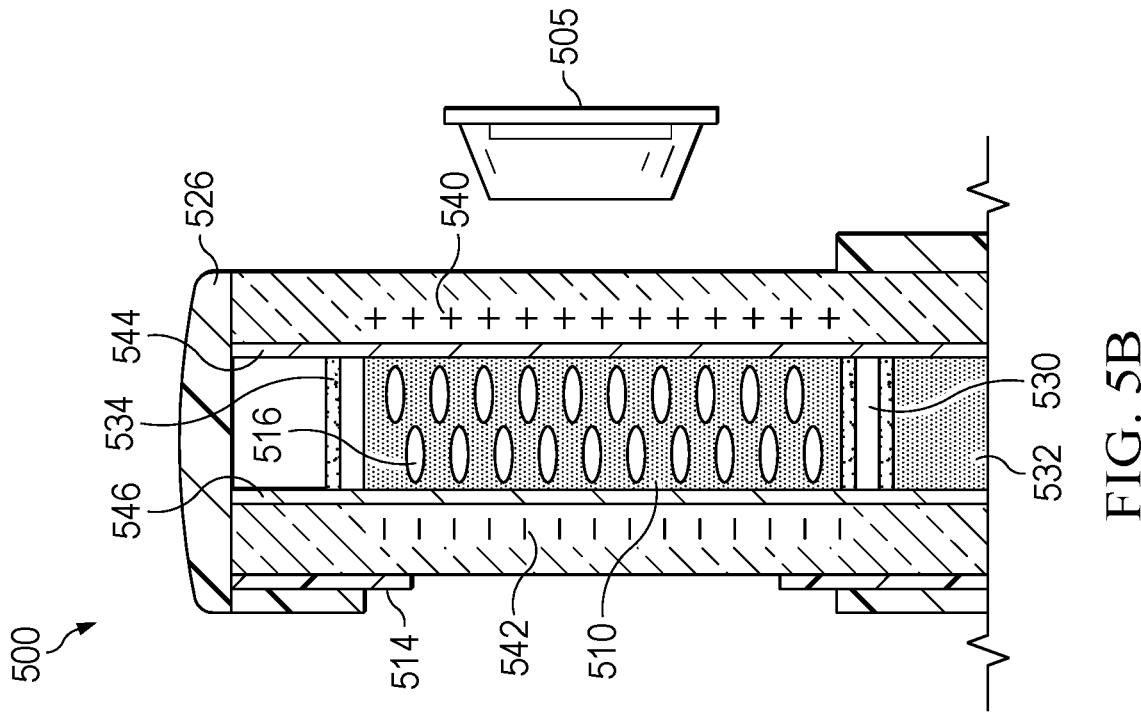
FIGS. 5A and 5B, generally referred to as FIG. 5, show cut away side views of an electronic shutter component.
Figure 5A:
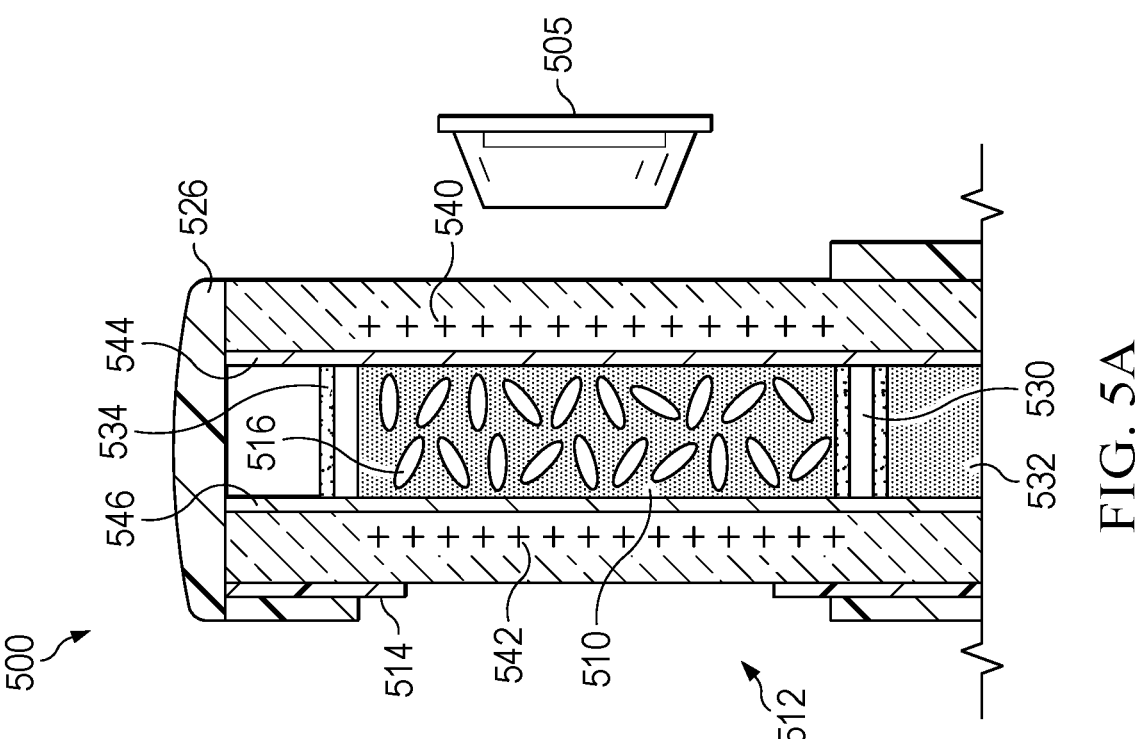

FIGS. 5A and 5B, generally referred to as FIG. 5, show cut away side views of an electronic shutter component 500. More specifically, FIG. 5A shows a cut away side view of an electronic shutter component 500 in a camera off mode of operation and FIG. 5B shows a cut away side view of an electronic shutter component 500 in a camera on mode of operation. When in the camera off mode of operation, the electronic shutter component restricts visual access to the camera lens 505. When in the camera on mode of operation, the electronic shutter component provides visual access to the camera lens 505.

In certain embodiments, the electronic shutter component 500 includes an electronically controllable obfuscation device 510. In certain embodiments, the electronically controllable obfuscation device 510 includes a liquid crystal display (LCD) panel. In certain embodiments, the LCD panel is an electronically modulated optical device that uses the light modulating properties of liquid crystals to control whether the shutter component 500 is functioning in a camera off mode of operation or a camera on mode of operation.

In certain embodiments, the electronically controllable obfuscation device 510 includes a switchable film polymer dispersed liquid crystal (PDLC) device. In certain embodiments, when the switchable film polymer dispersed liquid crystal device is configured in a natural state, the PDLC molecules are arranged in a way that causes light waves to refract through and reflect away from the surface of the device, thus distorting the state of the device to present as frosted. In certain embodiments, when the switchable film polymer dispersed liquid crystal device is configured in an active state (such as when a voltage differential is applied to the switchable film polymer dispersed liquid crystal device (see e.g., FIG. 5B)) the PDLC molecules are polarized, thus allowing light to pass through the switchable film polymer dispersed liquid crystal device. In certain embodiments, the switchable film polymer dispersed liquid crystal device includes a polymer dispersed liquid crystal core layer which includes liquid crystal droplets 516 suspended in a polymer film.

In certain embodiments, the electronically controllable obfuscation device 510 is mounted between the camera lens 505 and a viewing aperture 512 defined by a display device housing 520. In certain embodiments, the viewing aperture 512 is defined by an outer fame portion 514 of the display device (also referred to as the black matrix of the display device). In certain embodiments, the electronically controllable obfuscation device 510 is mounted within a void of the display device housing 520.

In certain embodiments, electronic shutter component 500 includes a sealant portion 530 which separates the electronically controllable obfuscation device 510 from a main display 532 of the display device. In certain embodiments, the electronic shutter component 500 includes a second sealant portion 534 positioned along a top edge of the electronically controllable obfuscation device 510. In certain embodiments, the sealant portion 530 and the sealant portion 534 are integrated within a single sealant component. In certain embodiments, the single sealant component is substantially (i.e., +/−10%) circularly shaped. In certain embodiments, the single sealant component provides a substantially (i.e., +/−10%) circularly shaped electronically controllable obfuscation device 510. In certain embodiments, the main display 532 includes an LCD panel. In certain embodiments, the LCD panel of the main display 532 is separated from the LCD panel of the electronically controllable obfuscation device 510 by the sealant portion 530.

In certain embodiments, the display device housing 520 includes an inner shutter wall portion 540, an outer shutter wall portion 542, or a combination thereof. In certain embodiments, the inner shutter wall portion 540, the outer shutter wall portion 542, or a combination thereof, are configured from an optically clear material. In certain embodiments, the optically clear material includes a clear plastic material. In certain embodiments, the clear plastic material includes a polyethylene terephthalate (PET) plastic material.

In certain embodiments, the inner shutter wall portion 540 includes an inner wall electrically conductive edge portion 544. In certain embodiments, the outer shutter wall portion 542 includes an outer wall electrically conductive edge portion 546. In certain embodiments, the inner wall electrically conductive edge portion 544, outer wall electrically conductive edge portion 546, or a combination thereof, include one or more respective Indium Tin Oxide (ITO) layers.

Figure 6:
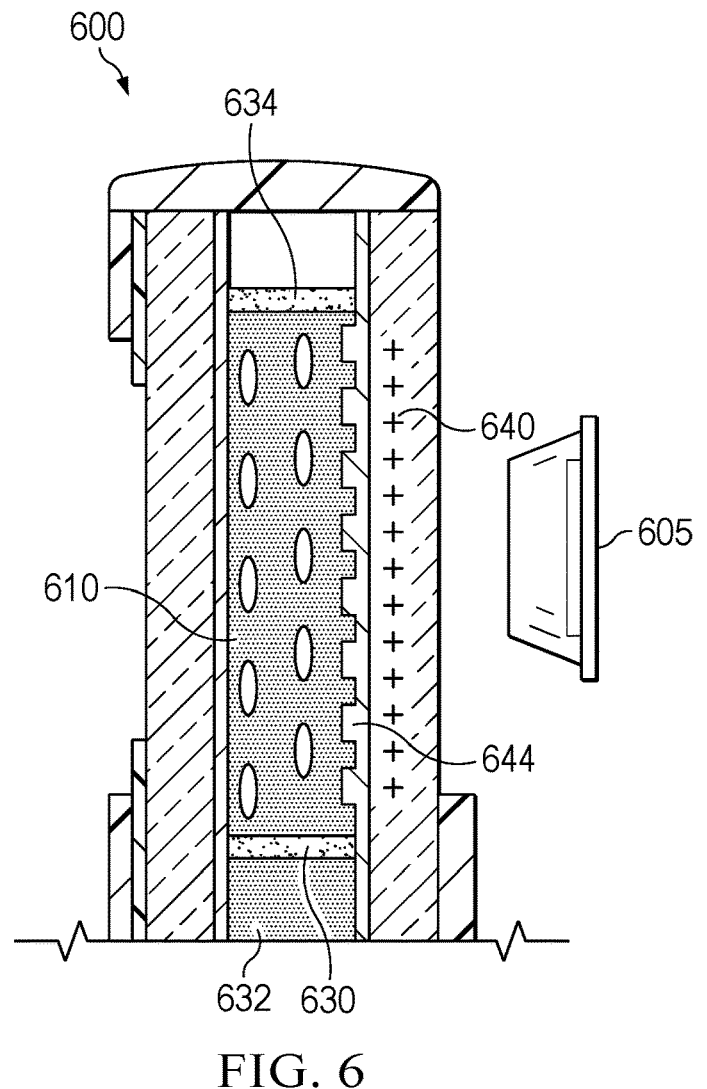
FIG. 6 shows a cut away side view of an electronic shutter component.

FIG. 6 shows a cut away side view of an electronic shutter component 600. When in the camera off mode of operation, the electronic shutter component restricts visual access to the camera lens 605. When in the camera on mode of operation, the electronic shutter component provides visual access to the camera lens 605. In certain embodiments, the electronic shutter component 600 includes an electronically controllable obfuscation device 610. In certain embodiments, the electronically controllable obfuscation device 610 includes a liquid crystal display (LCD) panel. In certain embodiments, the LCD panel is an electronically modulated optical device that uses the light modulating properties of liquid crystals to control whether the shutter component 600 is functioning in a camera off mode of operation or a camera on mode of operation.

In certain embodiments, the electronically controllable obfuscation device 610 includes a switchable film polymer dispersed liquid crystal (PDLC) device. In certain embodiments, when the switchable film polymer dispersed liquid crystal device is configured in a natural state, the PDLC molecules are arranged in a way that causes light waves to refract through and reflect away from the surface of the device, thus distorting the state of the device to present as frosted. In certain embodiments, when the switchable film polymer dispersed liquid crystal device is configured in an active state (such as when a voltage differential is applied to the switchable film polymer dispersed liquid crystal device) the PDLC molecules are polarized, thus allowing light to pass through the switchable film polymer dispersed liquid crystal device. In certain embodiments, the switchable film polymer dispersed liquid crystal device includes a polymer dispersed liquid crystal core layer which includes liquid crystal droplets 616 suspended in a polymer film.

In certain embodiments, the electronically controllable obfuscation device 610 is mounted between the camera lens 605 and a viewing aperture 612 defined by a display device housing 620. In certain embodiments, the viewing aperture 612 is defined by a front deco portion 614 of the display device housing 620. In certain embodiments, the electronically controllable obfuscation device 610 is mounted within a void of the display device housing 620.

In certain embodiments, electronic shutter component 600 includes a sealant portion 630 which separates the electronically controllable obfuscation device 610 from a main display 632 of the display device. In certain embodiments, the electronic shutter component 600 includes a second sealant portion 634 positioned along a top edge of the electronically controllable obfuscation device 610. In certain embodiments, the sealant portion 630 and the sealant portion 634 are integrated within a single sealant component. In certain embodiments, the single sealant component is substantially (i.e., +/−10%) circularly shaped. In certain embodiments, the single sealant component provides a substantially (i.e., +/−10%) circularly shaped electronically controllable obfuscation device 610. In certain embodiments, the main display 632 includes an LCD panel. In certain embodiments, the LCD panel of the main display 632 is separated from the LCD panel of the electronically controllable obfuscation device 610 by the sealant portion 630.

In certain embodiments, the display device housing 620 includes an inner shutter wall portion 640, an outer shutter wall portion 642, or a combination thereof. In certain embodiments, the inner shutter wall portion 640, the outer shutter wall portion 642, or a combination thereof, are configured from an optically clear material. In certain embodiments, the optically clear material includes a clear plastic material. In certain embodiments, the clear plastic material includes a polyethylene terephthalate (PET) plastic material.

In certain embodiments, the inner shutter wall portion 640 includes an inner wall electrically conductive edge portion 644. In certain embodiments, the outer shutter wall portion

642 includes an outer wall electrically conductive edge portion 646. In certain embodiments, the inner wall electrically conductive edge portion 644, outer wall electrically conductive edge portion 646, or a combination thereof, are patterned. In certain embodiments, the inner wall electrically conductive edge portion 644, outer wall electrically conductive edge portion 646, or a combination thereof, are patterned to apply a voltage differential across the electronically controllable obfuscation device 610. In certain embodiments, the inner wall electrically conductive edge portion 644, outer wall electrically conductive edge portion 646, or a combination thereof, are patterned to apply a voltage differential across the switchable film polymer dispersed liquid crystal device. In certain embodiments, the inner wall electrically conductive edge portion 644, outer wall electrically conductive edge portion 646, or a combination thereof, include one or more respective Indium Tin Oxide (ITO) layers.

Figure 7:
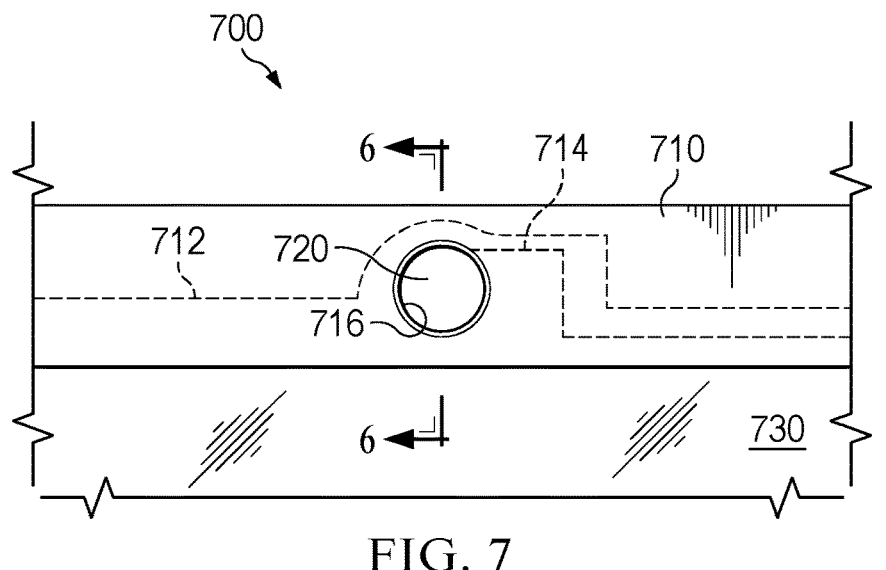
FIG. 7 shows a front view of a portion of a display device having an integrated camera system and associated electronic shutter component.

FIG. 7 shows a front view of a portion of a display device 700 having an integrated camera system and associated electronic shutter component. In certain embodiments, the display device 700 includes an outer frame portion 710 of a display device housing (also referred to as the black matrix of the display device). In certain embodiments, the outer frame portion 710 includes a first electrically conductive signal path 712, a second electrically conductive signal path 714, or a combination thereof. In certain embodiments, the first electrically conductive signal path 712 transmits a ground signal. In certain embodiments, the second electrically conductive signal path 714 transmits a voltage signal. In certain embodiments, the second electrically conductive signal path 714 functions as an on/off transmission line.

In certain embodiments, a viewing aperture 716 is defined by the outer fame portion 710 of the display device. In certain embodiments, an electronically controllable obfuscation device 720 is mounted between a camera lens and the viewing aperture 716. In certain embodiments, the outer frame portion 710 includes the first electrically conductive signal path 712, the second electrically conductive signal path 714, or a combination thereof, are coupled to the electronically controllable obfuscation device 720.

Figure 8:
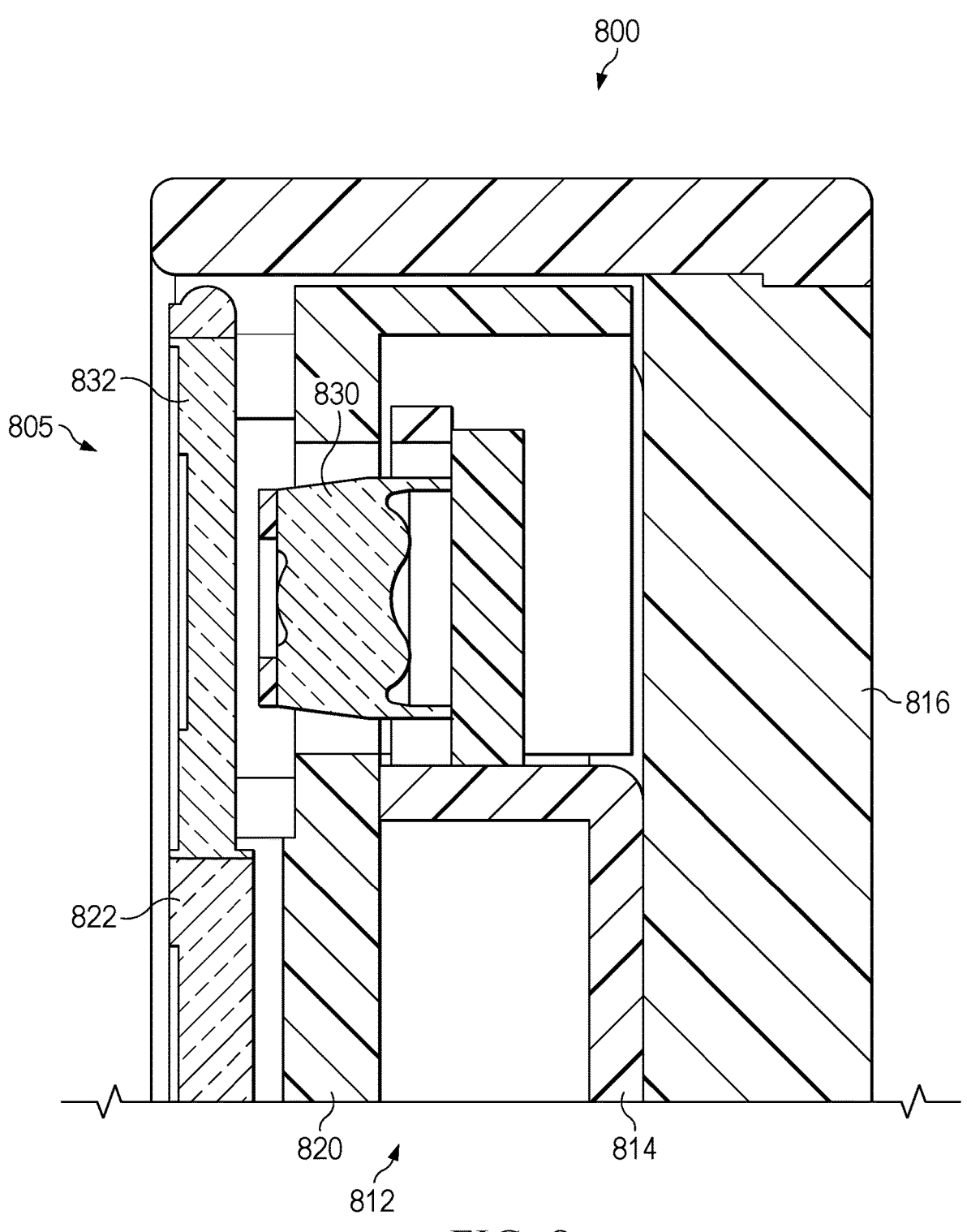
FIG. 8 shows a cute away side view of a portion of a display device having an embedded camera system with an integrated camera aperture system.

FIG. 8 shows a cut away side view of a portion of a display device 800 having an embedded camera system 805. In certain embodiments, display device 800 corresponds to display device 300. In certain embodiments, the embedded camera system 805 corresponds to embedded camera system 310.

In certain embodiments, the display device 800 includes a display portion 812, a support frame portion 814, a rear frame portion 816, or a combination thereof. In certain embodiments, the display frame portion 812 includes a display component 820, a front display panel 822, or a combination thereof. In certain embodiments, one or both the display component 820 and the front display panel 822 are mounted to the display frame portion 812. In certain embodiments, the display device frame portion 814 is integrated within a middle frame component of the display device 800. In certain embodiments, the rear frame portion 816 is mounted along an outside edge of the support frame portion 814.

In certain embodiments, the embedded camera system 805 includes a camera component 830, an associated electronic aperture component 832, a display frame portion 840, a display device frame portion 842, or a combination thereof. In certain embodiments, the display frame portion 840 is integrated within the display frame portion 812 of the display device 800. In certain embodiments, the display device frame portion 812 is integrated within the display device frame portion 814 of the display device 800.

In certain embodiments, the camera component 830 is embedded along an edge of the display device frame portion 840. In certain embodiments, the camera component 830 fits within a void defined by the display frame portion 840. In certain embodiments, the camera component 830 is embedded along a top edge of the display device frame portion 812. In certain embodiments, the camera component 830 is embedded in a center area of the display device frame portion 842.

In certain embodiments, the electronic aperture component 832 is mounted in front of a lens of the camera component 830. In certain embodiments, the electronic shutter component is positioned along a top edge of the front panel display 822. In certain embodiments, the camera component 830, the electronic aperture component 832 or a combination thereof, are mounted in a center area of the display device frame portion.

Figure 9B:
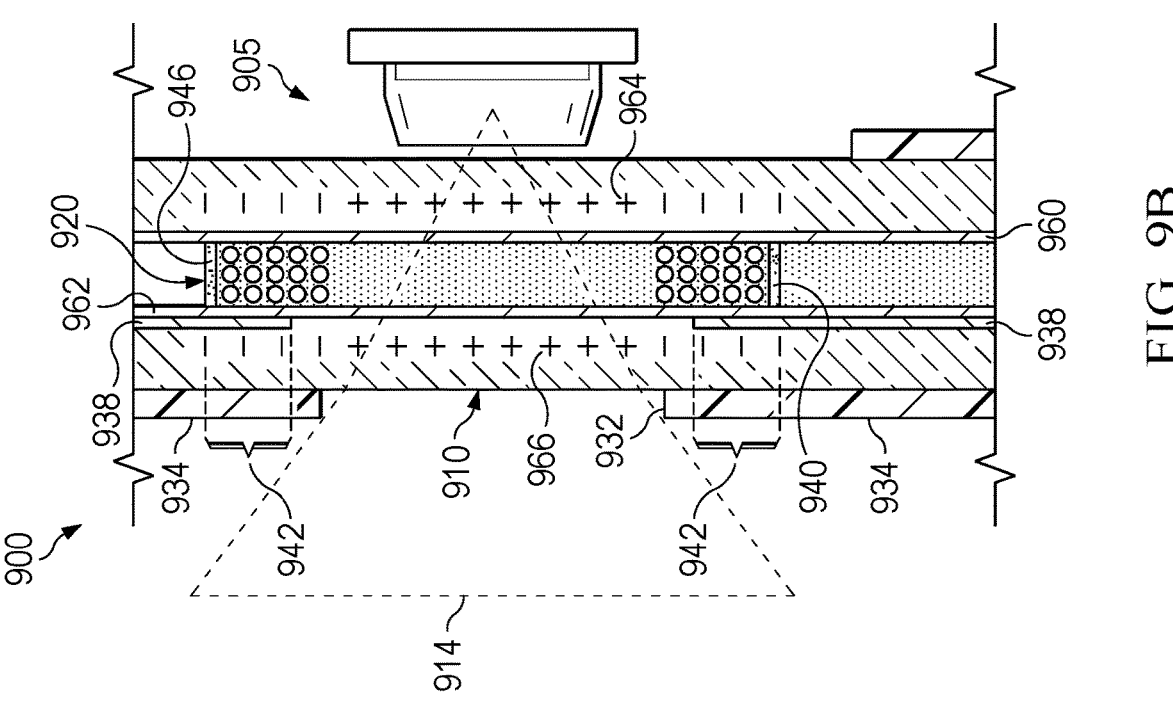
FIGS. 9A and 9B, generally referred to as FIG. 9, show cut away top views a portion of a display device having an embedded camera system with an integrated camera aperture system.
Figure 9A:
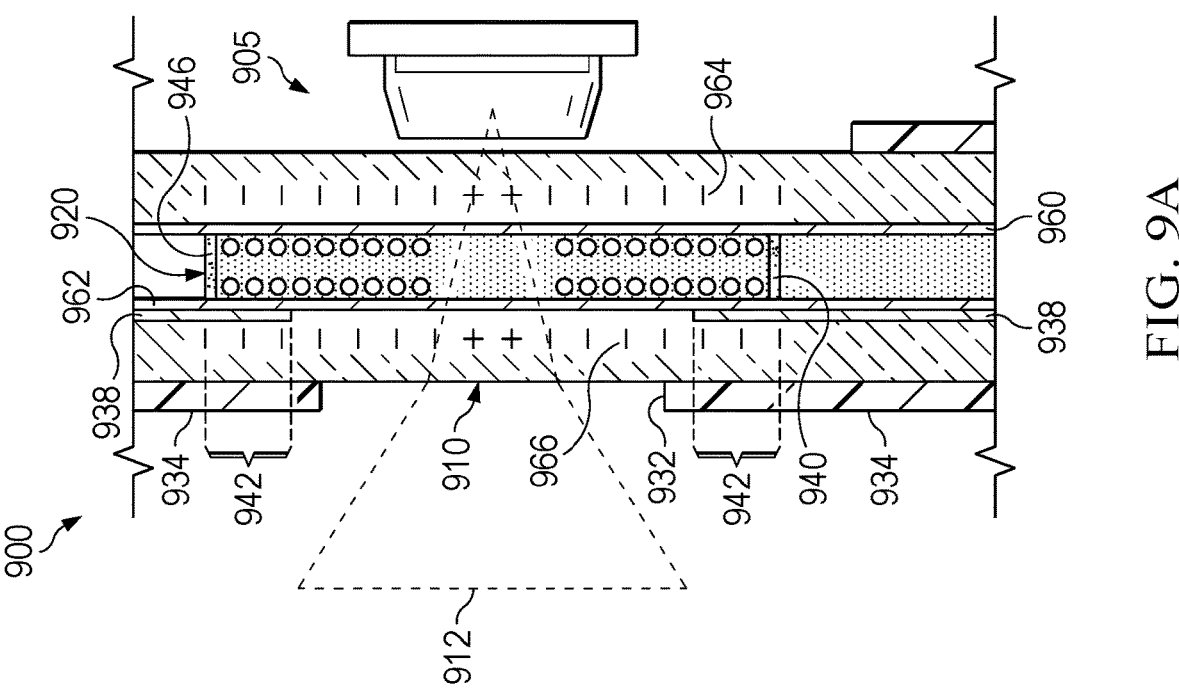

FIGS. 9A and 9B, generally referred to as FIG. 9 show cut away top views a portion of a display device 900 having an embedded camera system 905 with an integrated camera aperture system 910. More specifically, FIG. 9A shows a cut away side view of an integrated camera aperture system 910 in a first aperture mode of operation and FIG. 9B shows a cut away side view of an integrated camera aperture system 910 in a second aperture mode of operation. When in the first aperture mode of operation, the electronic aperture component provides a narrow aperture access, and thus a narrow field of view 912, to the camera lens of the camera system 905. When in the second aperture mode of operation, the integrated camera aperture system provides a wide aperture access, and thus a wider field of view 914, to the camera lens of the camera system 905. In certain embodiments, display device 900 corresponds to display device 300. In certain embodiments, the embedded camera system 905 corresponds to embedded camera system 310. In certain embodiments, the integrated camera aperture system 910 corresponds to electronic aperture system 832.

In certain embodiments, the integrated camera aperture system 910 includes an electronically controllable aperture portion 920. In certain embodiments, the electronically controllable aperture portion 920 includes an electronic ink (E Ink) panel. In certain embodiments, the E Ink panel is an electronically modulated optical device that uses charged micro capsules to control an aperture diameter of the integrated camera aperture system 910. In certain embodiments, each micro capsule presents as substantially (i.e., +/−20%) black where the positioning of the micro capsules is controlled by the positioning of charges across the E Ink panel. In certain embodiments, when a micro capsule is positively charged, the micro capsule presents as substantially (i.e., +/−20%) clear and when a micro capsule is negatively charge, the micro capsule presents as substantially (i.e., +/−20%) black.

In certain embodiments, the electronically controllable aperture portion 920 is mounted between the camera system 905 and a viewing aperture 932 defined by a display device housing 934. In certain embodiments, the viewing aperture 932 is defined by an outer frame portion 938 of the display device (also referred to as the black matrix of the display device). In certain embodiments, the electronically controllable aperture portion 920 is mounted within a void of the display device housing 934. In certain embodiments, the outer frame portion 938 defines a particle receiving space 942. In certain embodiments, the particle receiving space 942 receives the micro capsules of the E Ink panel so that the micro capsules are not visible when the aperture is in a completely open configuration.

In certain embodiments, electronically controllable aperture portion 920 includes a sealant portion 940 which separates the electronically controllable aperture portion 920 from a main display of the display device. In certain embodiments, the sealant portion 940 is substantially (i.e., +/−10%) circularly shaped. In certain embodiments, the sealant component 940 provides a substantially (i.e., +/−10%) circularly shaped electronically controllable aperture portion 920. In certain embodiments, the display device 900 includes an LCD panel. In certain embodiments, the LCD panel of the display device 900 is separated from the electronically controllable aperture portion 920 by the sealant portion 940.

In certain embodiments, the display device housing 934 includes an inner aperture wall portion 960, an outer aperture wall portion 962, or a combination thereof. In certain embodiments, the inner aperture wall portion 960, the outer aperture wall portion 962, or a combination thereof, are configured from an optically clear material. In certain embodiments, the optically clear material includes a clear plastic material. In certain embodiments, the clear plastic material includes a polyethylene terephthalate (PET) plastic material.

In certain embodiments, the inner aperture wall portion 960 includes an inner wall electrically conductive edge portion 964. In certain embodiments, the outer aperture wall portion 962 includes an outer wall electrically conductive edge portion 966. In certain embodiments, the inner wall electrically conductive edge portion 964, the outer wall electrically conductive edge portion 966, or a combination thereof, include one or more respective Indium Tin Oxide (ITO) layers. In certain embodiments, the inner wall electrically conductive edge portion 964, the outer wall electrically conductive edge portion 966, or a combination thereof, are patterned to provide different aperture diameters depending on how the patterns are activated. In certain embodiments, the patterns are substantially (i.e., +/−10%) circularly shaped. In certain embodiments, activation of portions of the inner wall electrically conductive edge portion 964, the outer wall electrically conductive edge portion 966, or a combination thereof, controls an aperture diameter of the electronically controllable aperture portion 920.

FIGS. 10A, 10B, 10C and 10D, generally referred to as FIG. 10, show cut away top and front views of an integrated camera aperture system 1000 with different respective opening diameters. In certain embodiments, the embedded camera system corresponds to embedded camera system 310.

Figure 10A:
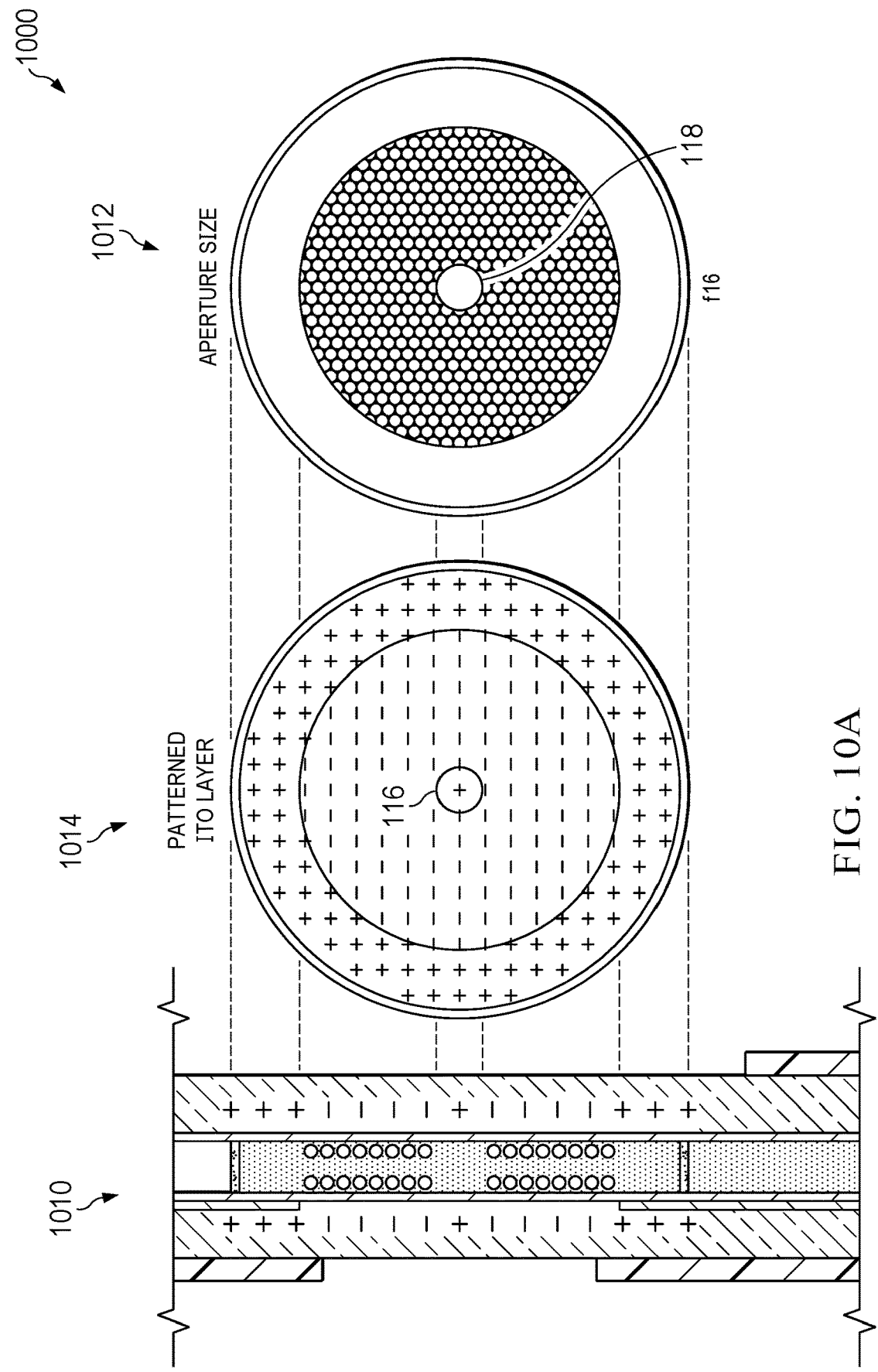
FIGS. 10A, 10B, 10C and 10D, generally referred to as FIG. 10, show cut away top and front views of an integrated camera aperture system with different respective opening diameters.
Figure 10B:
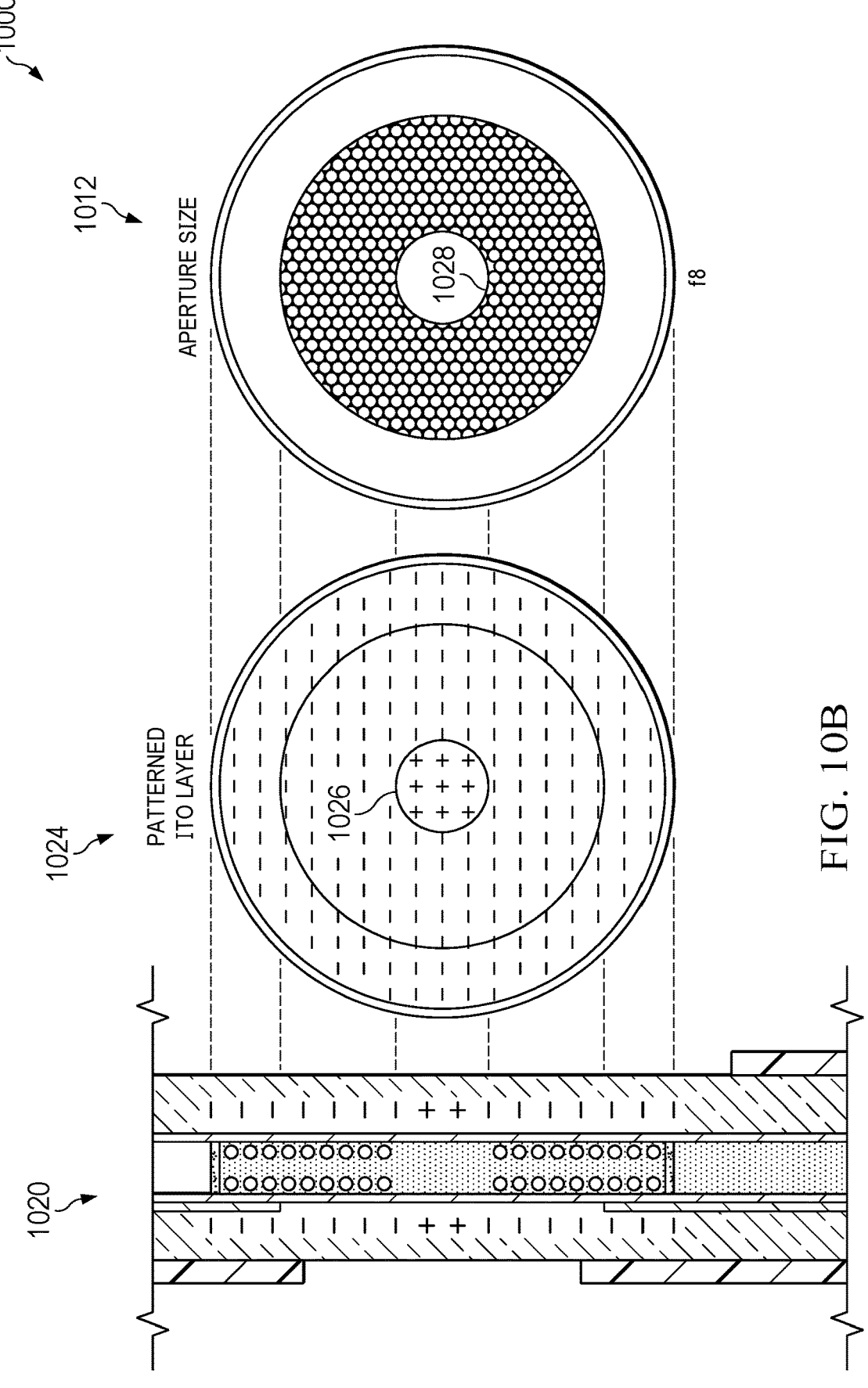
Figure 10C:
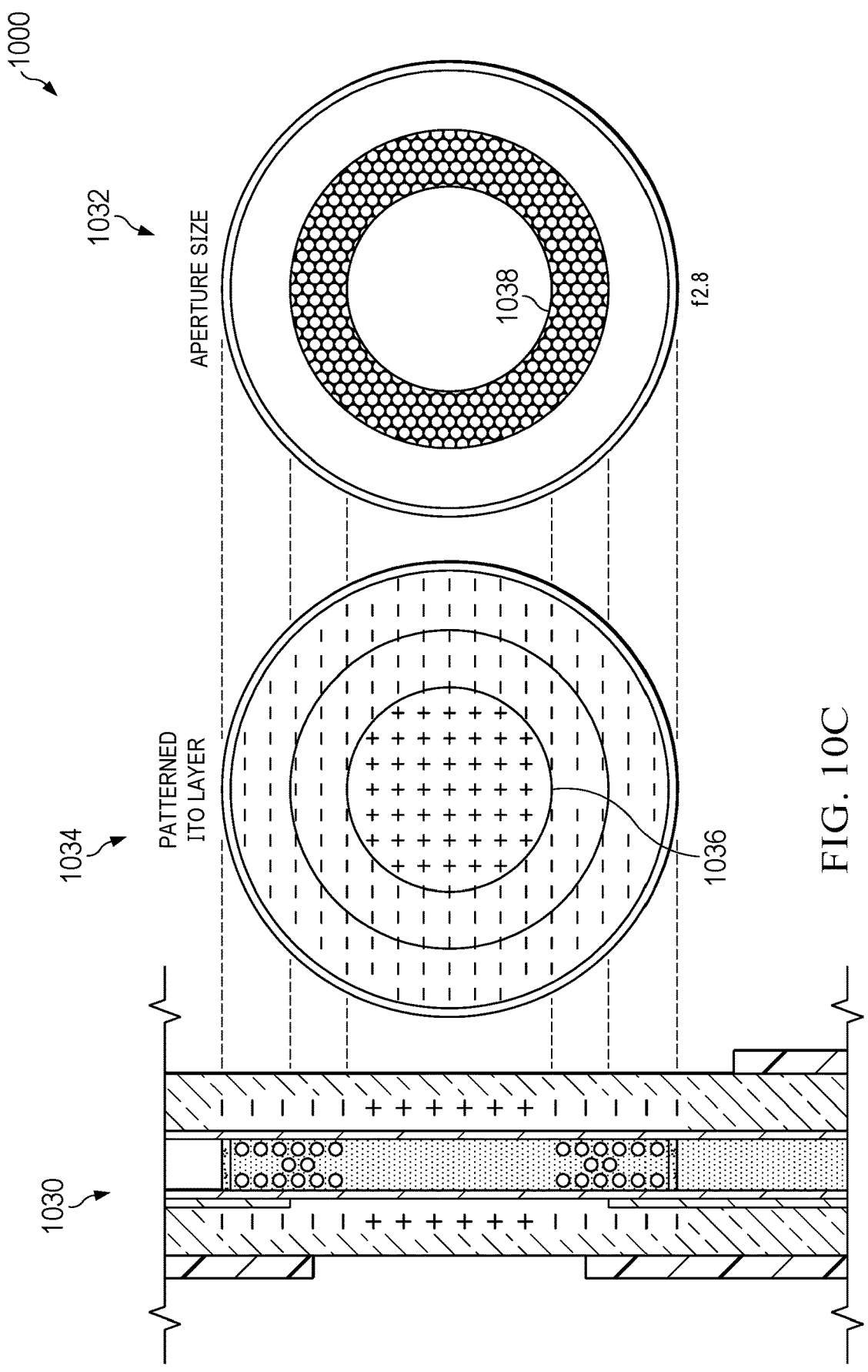
Figure 10D:
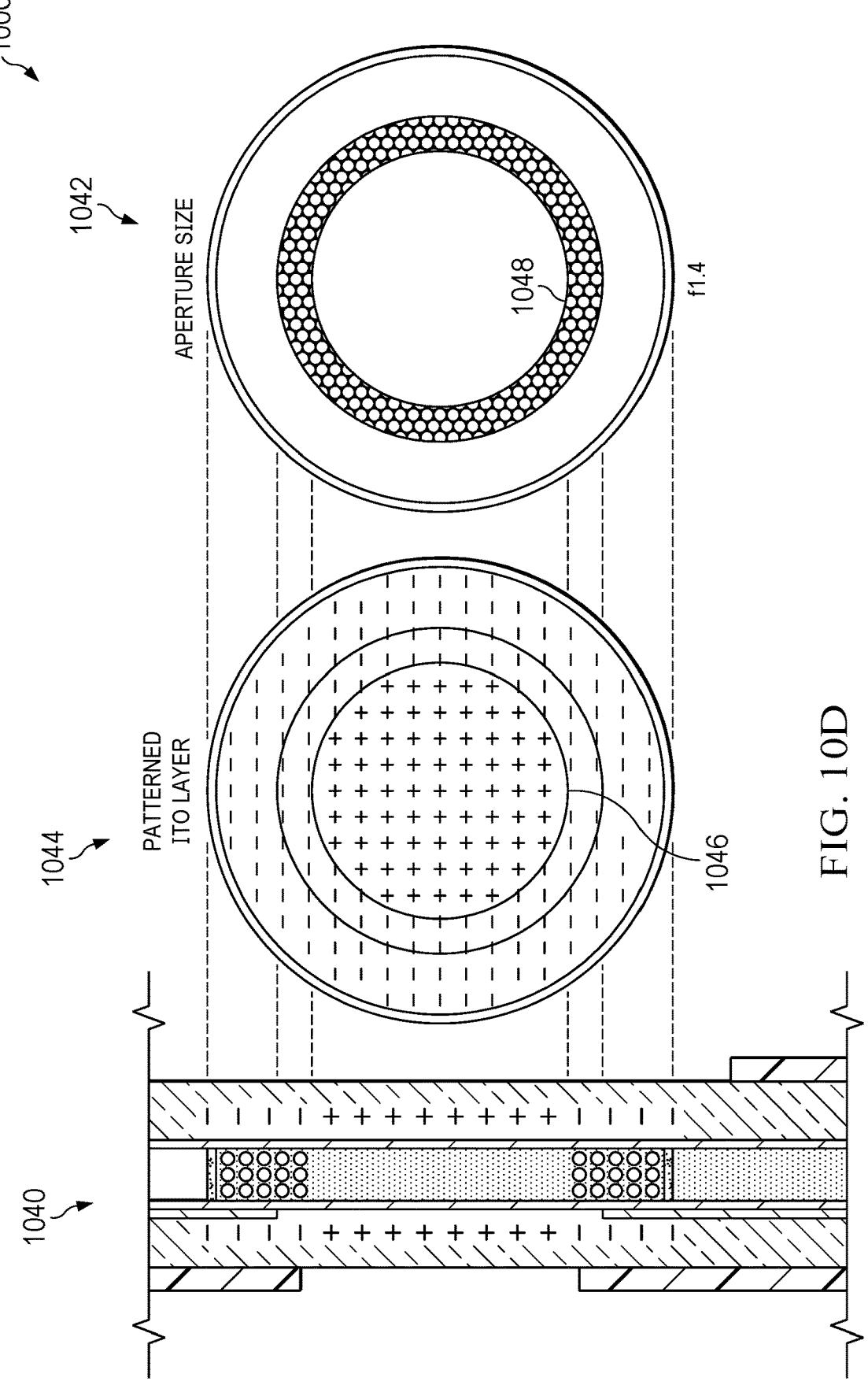

More specifically, FIG. 10A shows a cut away side and front view of an integrated camera aperture system 1000 in a first aperture mode of operation, FIG. 10B shows a cut away side and front view of an integrated camera aperture system 1000 in a second aperture mode of operation, FIG. 10C shows a cut away side and front view of an integrated camera aperture system 1000 in a third aperture mode of operation, FIG. 10D shows a cut away side and front view of an integrated camera aperture system 1000 in a fourth aperture mode of operation. When in the first aperture mode of operation, the electronic aperture component provides a narrow aperture access to a camera lens. When in the second aperture mode of operation, the integrated camera aperture system provides a slightly wider aperture access to the camera lens. When in the third aperture mode of operation, the integrated camera aperture system provides an additional slightly wider aperture access to the camera lens. When in the fourth aperture mode of operation, the integrated camera aperture system provides an additional slightly wider aperture access to the camera lens. In certain embodiments, the integrated camera aperture system 1000 corresponds to electronic aperture system 832.

In certain embodiments, the various aperture modes of operation correspond to respective aperture stops. In certain embodiments, each respective aperture stop has a corresponding f-number. As used herein, an f-number broadly refers to a measure of the light gathering ability of the camera system. In certain embodiments, the f-number is calculated by dividing the focal length of the cameral system by the overall diameter of the entrance pupil of the camera system. In certain embodiments, a higher f-number value corresponds to a smaller aperture diameter opening and a lower f-number value corresponds to a larger aperture diameter opening. As used herein, an aperture mode of operation broadly refers to controlling a diameter of an opening provided by a controllable aperture portion to control an amount of light propagated through the camera system.

In certain embodiments, the entrance pupil of the camera system is defined by the viewing aperture (e.g., viewing aperture 932) of the camera system. In certain embodiments, the first aperture mode of operation provides an aperture opening which corresponds to an f-number of f16. In certain embodiments, the second aperture mode of operation provides an aperture opening which corresponds to an f-number of f8. In certain embodiments, the third aperture mode of operation provides an aperture opening which corresponds to an f-number of f2.8. In certain embodiments, the fourth aperture mode of operation provides an aperture opening which corresponds to an f-number of f1.4.

In certain embodiments, the aperture mode of operation is controlled by a patterned electrically conductive structure. In certain embodiments, the patterned electrically conductive structure comprises an ITO structure. In certain embodiments, the patterned electrically conductive structure controls sets of micro capsules. In certain embodiments, the micro capsules correspond to E Ink micro capsules. In certain embodiments, when a micro capsule is positively charged, the micro capsule presents as substantially (i.e., +/−20%) clear and when a micro capsule is negatively charge, the micro capsule presents as substantially (i.e., +/−20%) black.

Referring now to FIG. 10A, a cut away side view 1010 of an integrated camera aperture system 1000, a cut away front view 1012 of an integrated camera aperture system 1000 and a cut away front view 1014 of a patterned layer of an integrated camera aperture system 1000 are shown. The voltage applied to sub areas of the patterned layer of the integrated camera aperture system 1000 controls micro capsules of the integrated camera aperture system 1000 to configure the integrated camera aperture system in the first aperture mode of operation. Accordingly, the positive voltage applied to the sub area 1016 controls the micro capsules to provide an aperture diameter 1018. In certain embodiments, the aperture diameter 1018 corresponds to an f-number of f16.

Referring now to FIG. 10B, a cut away side view 1020 of an integrated camera aperture system 1000, a cut away front view 1022 of an integrated camera aperture system 1000 and a cut away front view 1024 of a patterned layer of an integrated camera aperture system 1000 are shown. The voltage applied to sub areas of the patterned layer of the integrated camera aperture system 1000 controls micro capsules of the integrated camera aperture system 1000 to configure the integrated camera aperture system in the first aperture mode of operation. Accordingly, the positive voltage applied to the sub area 1026 controls the micro capsules to provide an aperture diameter 1028. In certain embodiments, the aperture diameter 1028 corresponds to an f-number of f8.

Referring now to FIG. 10C, a cut away side view 1030 of an integrated camera aperture system 1000, a cut away front view 1032 of an integrated camera aperture system 1000 and a cut away front view 1034 of a patterned layer of an integrated camera aperture system 1000 are shown. The voltage applied to sub areas of the patterned layer of the integrated camera aperture system 1000 controls micro capsules of the integrated camera aperture system 1000 to configure the integrated camera aperture system in the first aperture mode of operation. Accordingly, the positive voltage applied to the sub area 1036 controls the micro capsules to provide an aperture diameter 1038. In certain embodiments, the aperture diameter 1038 corresponds to an f-number of f2.8.

Referring now to FIG. 10D, a cut away side view 1040 of an integrated camera aperture system 1000, a cut away front view 1042 of an integrated camera aperture system 1000 and a cut away front view 1044 of a patterned layer of an integrated camera aperture system 1000 are shown. The voltage applied to sub areas of the patterned layer of the integrated camera aperture system 1000 controls micro capsules of the integrated camera aperture system 1000 to configure the integrated camera aperture system in the first aperture mode of operation. Accordingly, the positive voltage applied to the sub area 1046 controls the micro capsules to provide an aperture diameter 1048. In certain embodiments, the aperture diameter 1048 corresponds to an f-number of f1.4.

Other embodiments are within the following claims. For example, an integrated camera system can be configured to include an electronic shutter component and an electronic aperture component. Also, for example, an integrated camera system can be configured such that the electronic shutter component and the electronic aperture component are combined within an integrated device which performs both the shutter function and the aperture function.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. An embedded camera system for a display device comprising:
   a camera component, the camera component being physically coupled to a center area along a top edge of a display frame to embed the camera component within the display device; and,
   an electronic aperture component, the electronic aperture component being physically coupled to the center area along the top edge of the display frame of the display device, the electronic aperture component being mounted in front of a lens of the camera component, the electronic aperture component providing a variable diameter opening, the variable diameter opening controlling an amount of light received by the camera component, the variable diameter opening performing both a shutter function and an aperture function, the aperture function affecting a depth of field of the camera component; and wherein the electronic aperture component includes an electronically controllable aperture device, the electronically controllable aperture device restricting visual access to the camera component when the electronic aperture component is functioning in an aperture mode of operation;

the electronic aperture component comprises an inner aperture wall portion and an outer aperture wall portion, the inner aperture wall portion and the outer aperture wall portion being configured from an optically clear material; and, the inner aperture wall portion includes an inner aperture wall electrically conductive edge portion and the outer aperture wall portion includes an outer wall electrically conductive edge portion, the inner aperture wall electrically conductive edge portion and the outer aperture wall electrically conductive portion being controlled to apply a voltage to the electronic aperture component.

2. The embedded camera system of claim 1, wherein:

the electronically controllable aperture device comprises an electronic ink panel, the electronic ink panel being electronically modulated to control the amount of light received by the camera component.

3. The embedded camera system of claim 1, wherein:

the inner aperture wall electrically conductive edge portion and the outer wall electrically conductive edge portion are patterned to apply a patterned voltage to the electronic aperture component.

4. A display device comprising:

a display component;

a display frame;

an embedded camera system, the embedded camera system comprising a camera component, the camera component being physically coupled to a center area along a top edge of the display frame to embed the camera component within the display device; and, an electronic aperture component, the electronic aperture component being physically coupled to the center area along the top edge of the display frame of the display device, the electronic aperture component being mounted in front of a lens of the camera component, the electronic aperture component providing a variable diameter opening, the variable diameter opening controlling an amount of light received by the camera component, the variable diameter opening performing both a shutter function and an aperture function, the aperture function affecting a depth of field of the camera component; and wherein the electronic aperture component includes an electronically controllable aperture device, the electronically controllable aperture device restricting visual access to the camera component when the electronic aperture component is functioning in an aperture mode of operation;

the electronic aperture component comprises an inner aperture wall portion and an outer aperture wall portion, the inner aperture wall portion and the outer aperture wall portion being configured from an optically clear material; and, the inner aperture wall portion includes an inner aperture wall electrically conductive edge portion and the outer aperture wall portion includes an outer wall electrically conductive edge portion, the inner aperture wall electrically conductive edge portion and the outer aperture wall electrically conductive portion being controlled to apply a voltage to the electronic aperture component.

5. The display device of claim 4, wherein:

the electronically controllable aperture device comprises an electronic ink panel, the electronic ink panel being electronically modulated to control the amount of light received by the camera component.

6. The display device of claim 4, wherein:

the inner aperture wall electrically conductive edge portion and the outer wall electrically conductive edge portion are patterned to apply a patterned voltage to the electronic aperture component.

7. A system comprising:

a processor;

a data bus coupled to the processor; and a display device, the display device comprising a display component;

a display frame;

an embedded camera system, the embedded camera system comprising a camera component, the camera component being physically coupled to a center area along a top edge of the display frame to embed the camera component within the display device; and, an electronic aperture component, the electronic aperture component being physically coupled to the center area along the top edge of a display frame of the display device, the electronic aperture component being mounted in front of a lens of the camera component, the electronic aperture component providing a variable diameter opening, the variable diameter opening controlling an amount of light received by the camera component, the variable diameter opening performing both a shutter function and an aperture function, the aperture function affecting a depth of field of the camera component; and wherein the electronic aperture component includes an electronically controllable aperture device, the electronically controllable aperture device restricting visual access to the camera component when the electronic aperture component is functioning in an aperture mode of operation;

the electronic aperture component comprises an inner aperture wall portion and an outer aperture wall portion, the inner aperture wall portion and the outer aperture wall portion being configured from an optically clear material; and, the inner aperture wall portion includes an inner aperture wall electrically conductive edge portion and the outer aperture wall portion includes an outer wall electrically conductive edge portion, the inner aperture wall electrically conductive edge portion and the outer aperture wall electrically conductive portion being controlled to apply a voltage to the electronic aperture component.

8. The system of claim 7, wherein:

the electronically controllable aperture device comprises an electronic ink panel, the electronic ink panel being electronically modulated to control the amount of light received by the camera component.

9. The system of claim 7, wherein:

the inner aperture wall electrically conductive edge portion and the outer wall electrically conductive edge portion are patterned to apply a patterned voltage to the electronic aperture component.

* * * * *